United States Patent
Muroyama et al.

(10) Patent No.: US 9,507,703 B2
(45) Date of Patent: Nov. 29, 2016

(54) STORAGE CONTROL APPARATUS, STORAGE SYSTEM, AND STORAGE CONTROL METHOD TO ADJUST RAID SYSTEM STRIP SIZE

(71) Applicant: FUJITSU LIMITED, Kawasaki-shi (JP)

(72) Inventors: Tomohiko Muroyama, Yokohama (JP); Masahiro Yoshida, Kawasaki (JP); Tadashi Matsumura, Kawasaki (JP); Noriyuki Yasu, Kawasaki (JP); Motoki Sotani, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 375 days.

(21) Appl. No.: 13/803,501

(22) Filed: Mar. 14, 2013

(65) Prior Publication Data

US 2013/0262813 A1  Oct. 3, 2013

(30) Foreign Application Priority Data

Mar. 30, 2012 (JP) ................... 2012-080650

(51) Int. Cl.
  *G06F 12/02* (2006.01)
  *G06F 3/06* (2006.01)
(52) U.S. Cl.
  CPC .............. *G06F 12/02* (2013.01); *G06F 3/061* (2013.01); *G06F 3/064* (2013.01); *G06F 3/0653* (2013.01); *G06F 3/0689* (2013.01); *G06F 3/0632* (2013.01)
(58) Field of Classification Search
  CPC ..... G06F 3/061; G06F 3/0689; G06F 3/0632
  See application file for complete search history.

(56) References Cited

U.S. PATENT DOCUMENTS

| | | | | |
|---|---|---|---|---|
| 6,223,300 | B1 * | 4/2001 | Gotoh | 714/5.1 |
| 6,347,359 | B1 * | 2/2002 | Smith et al. | 711/114 |
| 7,296,135 | B2 | 11/2007 | Thompson | |
| 8,244,965 | B2 * | 8/2012 | Huang | G06F 12/0246 711/103 |
| 8,244,966 | B2 * | 8/2012 | Huang | 711/103 |

(Continued)

FOREIGN PATENT DOCUMENTS

| | | |
|---|---|---|
| JP | 08-129461 A | 5/1996 |
| JP | 11-454057 A | 6/1999 |
| JP | 2002-182860 A | 6/2002 |
| JP | 2006-134021 A | 5/2006 |
| JP | 2008-269015 | 11/2008 |
| JP | 2010-531493 A | 9/2010 |

OTHER PUBLICATIONS

Extended European Search Report issued May 28, 2013 for corresponding EP patent application No. 13158344.5.
Japanese Office Action mailed Oct. 20, 2015 for corresponding Japanese Patent Application No. 2012-080650, with Partial English Translation, 6 pages.

*Primary Examiner* — Charles Rones
*Assistant Examiner* — Tian-Pong Chang
(74) *Attorney, Agent, or Firm* — Fujitsu Patent Center

(57) ABSTRACT

In a storage control apparatus, an acquiring unit acquires first information indicating the frequency of random access to a first logical region and second information indicating the data size of random access, based on the content of access from the information processing apparatus. A controlling unit determines the size of storage areas to be allocated to a second logical region based on the second information indicating the data size of random access when the first information indicates that the frequency of random access is equal to or greater than a threshold value. The controlling unit creates the second logical region using a plurality of storage devices. The controlling unit controls access from the information processing apparatus such that the access is made to the second logical region instead of the first logical region.

18 Claims, 18 Drawing Sheets

(56) References Cited

U.S. PATENT DOCUMENTS

| | | | |
|---|---|---|---|
| 2002/0091903 A1* | 7/2002 | Mizuno | 711/154 |
| 2006/0101221 A1 | 5/2006 | Harada | |
| 2006/0277361 A1 | 12/2006 | Sharma et al. | |
| 2007/0079105 A1* | 4/2007 | Thompson | 711/201 |
| 2008/0016021 A1* | 1/2008 | Gulbeden | G06F 17/30144 |
| 2008/0256304 A1 | 10/2008 | Kezuka et al. | |
| 2010/0100669 A1 | 4/2010 | Huang | |

* cited by examiner

700 READ REQUEST

| LUN | OFFSET FROM HEAD OF LOGICAL VOLUME | THE NUMBER OF READ BYTES |
|---|---|---|
|  |  |  |
| 0 | 678 | 72KB |

FIG. 6

| RAID GROUP MANAGEMENT TABLE | | |
|---|---|---|
| RAID GROUP | DISK NUMBER | THE NUMBER OF LBAS |
| 0 | 0,1,2,3 | 524288 |
| 1 | 4,5,6,7,8 | 524288 |

| LOGICAL VOLUME MANAGEMENT TABLE | | | |
|---|---|---|---|
| LUN | RAID GROUP | LEADING HEAD LBA | THE TOTAL NUMBER OF LBAS |
| 0 | 0 | 0 | 131072 |
| 1 | 0 | 131072 | 131072 |

| ACCESS MANAGEMENT TABLE | | | | | | |
|---|---|---|---|---|---|---|
| RAID GROUP | LUN | TOTAL ACCESS COUNT | RANDOM ACCESS COUNT | AVERAGE READ BYTE COUNT | STRIP SIZE | ADJUST-MENT FLAG |
| 0 | 0 | 61287 | 55817 | 78KB | 128KB | true |
| 0 | 1 | 52317 | 23450 | 225KB | 256KB | false |

FIG. 10

| ACCESS STATISTICS TABLE ||||| 136
| RAID GROUP | LUN | DAY OF THE WEEK | TIME ZONE | ACCESS COUNT |
|---|---|---|---|---|
| 0 | 0 | MON | 0:00 | 5237 |
| | | | 1:00 | 3125 |
| | | | ... | ... |
| | | TUE | 0:00 | 3719 |
| | | | 1:00 | 1183 |
| | | | ... | ... |
| ... | ... | ... | ... | ... |

FIG. 12

STORAGE CONTROL APPARATUS, STORAGE SYSTEM, AND STORAGE CONTROL METHOD TO ADJUST RAID SYSTEM STRIP SIZE

CROSS-REFERENCE TO RELATED APPLICATION

This application is based upon and claims the benefit of priority of the prior Japanese Patent Application No. 2012-080650, filed on Mar. 30, 2012, the entire contents of which are incorporated herein by reference.

FIELD

The embodiments discussed herein relate to a storage control apparatus, a storage system, and a storage control method.

BACKGROUND

Storage systems have been used for accumulating and utilizing data. A typical storage system includes a plurality of storage devices and a storage control apparatus that controls access to data stored in the plurality of storage devices. Such storage systems may use the RAID (Redundant Arrays of Independent Disks) technology. Some RAID configurations distribute sequential segments of data over a plurality of storage devices. This method is called "striping". With the aid of striping, the access load is distributed across a plurality of storage devices, thus realizing high speed access.

In the striping, the storage region of storage devices is divided into segments of a predetermined size. Each of these segments is called a "strip". The size of a strip is called "strip size" or "stripe depth". One logical storage region called a "stripe" is formed by combining several divided storage areas (strips) on different storage devices. For example, in the case of RAID level 0, the storage capacity of one stripe is the product of the strip size and the number of storage devices providing storage areas to the stripe. It is also possible to form a logical storage region by combining a plurality of such stripes.

The use of striping, however, does not always promise the efficiency of access to data. For example, the striping may foe unable to exert the effect of parallel processing when multiple concurrent access operations occur to data having a relatively large size (e.g., size equal to or greater than the storage capacity of one stripe). Another similar situation is when access to relatively small data concentrates on a particular storage device. In this case, the striping may be unable to sufficiently distribute the access load over a plurality of storage devices, because of the reduced chance of parallel processing.

The efficiency of data access may be improved by adjusting the strip size. For example, there is a proposal for counting access operations for each supported strip size, based on access logs. Access habits are grasped by analyzing the frequency of occurrences of each requested access size, and the strip size may be changed depending on the grasped access habits.

There is also another proposal for monitoring write commands or read commands and changing the strip size of array data when data having a specific size exceeds a defined percentage.

There is yet another proposal for analyzing the presence of boundary displacement (displacement of the write-start position of data in a cache memory on a storage device) or the amount of boundary displacement based on access information from a host apparatus. Furthermore, there is still another proposal for collecting configuration information about storage devices from the storage devices during the period when the load on the storage system is low. See, for example, the following patent literatures:

Japanese Laid-Open Patent Publication No. 11-154057;
Japanese Laid-Open Patent Publication No. 8-129461;
Japanese Laid-Open Patent Publication No. 2008-269015; and
Japanese Laid-Open Patent Publication No. 2006-134021.

A plurality of logical storage regions (also called "logical regions") may be created for various applications, with the striping as part of the underlying physical structure. Some application programs may produce frequent random access to logical regions. For example, database applications are among the programs of this nature. The current strip size may, however, not always be optimal in terms of the efficiency of such frequent random access. Thus, it is important how to determine an efficient strip size for those random access regions.

For example, random access may be made to data having a relatively small size. The performance of this type of random access is significantly influenced by the time consumed in physically searching a storage area of each storage device. Thus, if the accessed part of a logical region ranges across a plurality of storage devices, these storage devices have to seek the specified storage area, and the resulting overhead could lead to deterioration of access performance. For this reason, the striping does not exert its full performance when, for example, it is configured with a small strip size relative to the random access size.

SUMMARY

According to an embodiment, there is provided a storage control apparatus for use in controlling access from an information processing apparatus to a logical region in which a storage area of predetermined size is allocated from each of a plurality of storage devices. The storage control apparatus includes an acquiring unit configured to acquire first information indicating a frequency of random access to a first logical region and second information indicating a data size of random access based on the content of access from the information processing apparatus; and a controlling unit configured to determine the size of a storage area to be allocated to a second logical region based on the second information indicating the data size of random access and create the second logical region using a plurality of storage devices when the first information indicates that the frequency of the random access is equal to or greater than a threshold value, and control access from the information processing apparatus such that the access is made to the second logical region instead of the first logical region.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OR DRAWINGS

FIG. 6 illustrates an exemplary read request;

FIG. 8 illustrates an exemplary RAID group management table;

FIG. 9 illustrates an exemplary logical volume management table;

FIG. 10 illustrates an exemplary access management table;

FIG. 12 illustrates an exemplary access statistics table;

DESCRIPTION OF EMBODIMENTS

Figure 1:
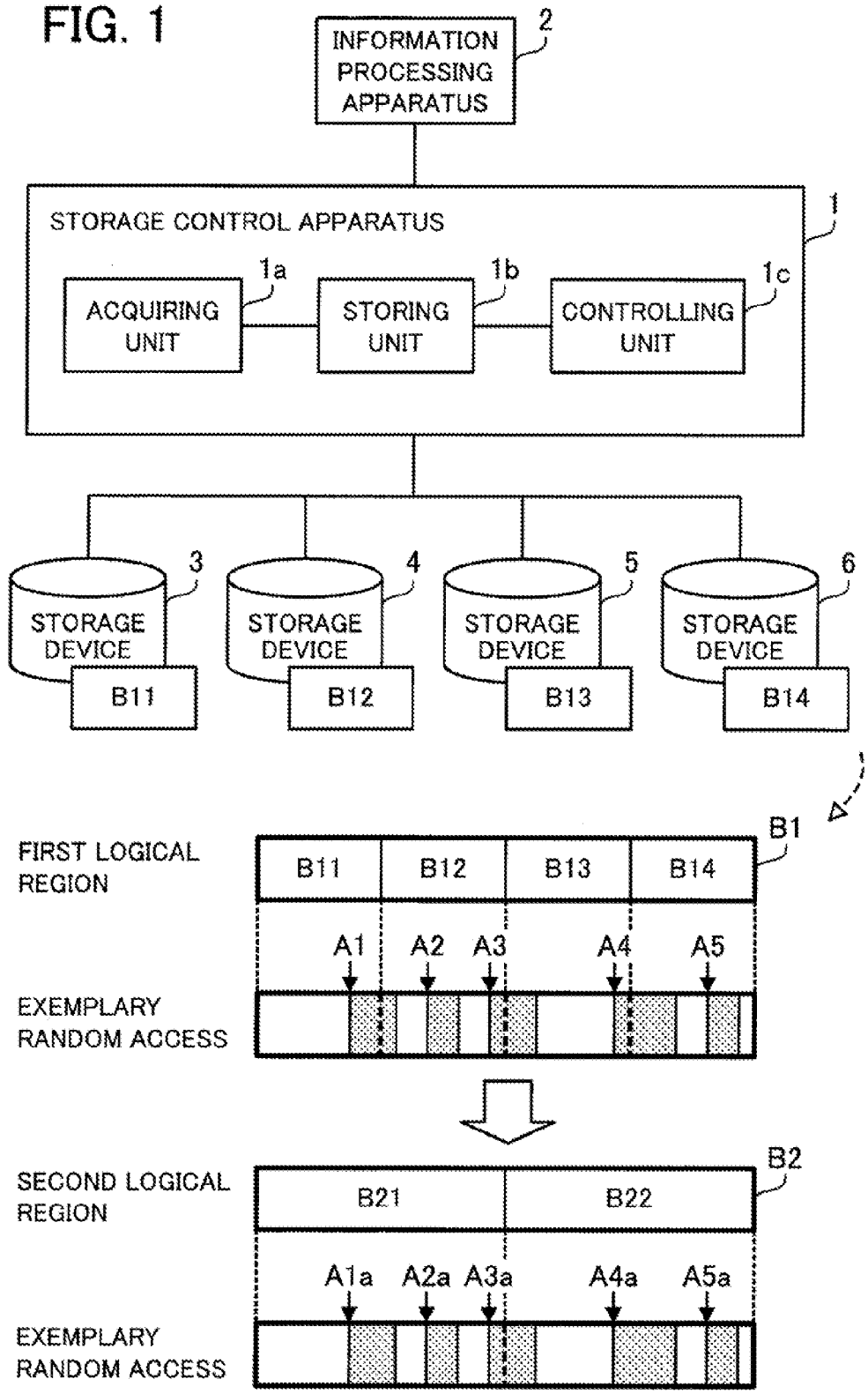
FIG. 1 illustrates a storage control apparatus according to a first embodiment.

Several embodiments of a storage control apparatus will be described below with reference to the accompanying drawings, wherein like reference numerals refer to like elements throughout.

(a) First Embodiment

FIG. 1 illustrates a storage control apparatus according to a first embodiment. A storage control apparatus 1 is connected to an information processing apparatus 2 and a plurality of storage devices including storage devices 3, 4, 5, and 6. The storage control apparatus 1 is used to control access from the information processing apparatus 2 to a logical region B1. The logical region B1 is created using the storage devices 3, 4, 5, and 6. Each of the storage devices 3, 4, 5, and 6 has a storage area with a predetermined size. Specifically, the storage device 3 has a storage area B11. The storage device 4 has a storage area B12. The storage device 5 has a storage area B13. The storage device 6 has a storage area B14. The logical region B1 is a logically united storage region that is actually formed from separate storage areas B11, B12, B13, and B14 to enable data striping. The size of this logical region B1 is the sum of those of the storage areas B11, B12, B13, and B14.

The storage control apparatus 1 includes an acquiring unit 1a, a storing unit 1b, and a controlling unit 1c.

The acquiring unit 1a stores first information indicating the frequency of random access to the logical region B1 in the storing unit 1b based on the content of access from the information processing apparatus 2. Also, the acquiring unit 1a acquires second information indicating the data size of random access (data size per random access operation) and stores the acquired second information in the storing unit 1b.

The storing unit 1b stores the above first information indicating the frequency of random access acquired by the acquiring unit 1a and the second information indicating the data size of random access while associating them with information indicating the logical region B1.

The controlling unit 1c determines, with reference to the storing unit 1b, the size of storage areas to be allocated to another logical region B2 based on the second information indicating the data size of random access when the first information indicates that the frequency of random access is equal to or greater than a threshold value.

Here, the term "frequency of random access" refers to, for example, the ratio of the number of random access operations to the total number of access operations. Alternatively, the number of random access operations during a predetermined period of time may also be referred to as the frequency of random access.

The logical region B2 is a substitute logical region for the logical region B1. For example, the controlling unit 1c determines an average data size per random access operation, based on information indicating the individual sizes of a plurality of data objects that have undergone random access, and then selects a value greater than the average data sire as the size of each storage area to be allocated to the logical region B2. This choice of storage area size reduces the potential of making random access to data lying across two or more storage devices. For example, the storage areas size may be determined to be two or more times the average data size noted above.

When it is determined that the storage areas B11, B12, B13, and B14 are sufficiently large, a smaller size may be appropriate for the storage areas to be allocated to the logical region B2. This is because it is highly probable that access concentrates on a specific storage device if the strip size is too large. Such concentrated access would impose an increased load on that specific storage device, thus resulting in poor access performance.

The controlling unit 1c creates a logical region B2 using at least some of the storage devices 3, 4, 5, and 6 and other storage devices. For example, the controlling unit 1c creates storage areas B21 and B22 and allocates the created storage areas B21 and B22 to the logical region B2. The size of these storage areas B21 and B22 may be greater than, or may be smaller than the current size of storage areas B11, B12, B13, and B14. When the former choice is made, the size of the storage areas B21 and B22 may be set to, for example, twice the current size. More specifically, the controlling unit 1c creates a storage area B21 corresponding to a combination of storage areas B11 and B12 and places the storage area B21 in the storage device 3. Also, the controlling unit 1c creates another storage area B22 corresponding to another combination of storage areas B13 and B14 and places the storage area B22 in the storage device 4. The size of the logical region B2 is, for example, the same as that of the logical region B1.

The controlling unit 1c controls access from the information processing apparatus 2 such that the access is made to the logical region B2 instead of the logical region B1. For example, assume that the information processing apparatus 2 accesses the logical region B1 using a predetermined identifier associated with the logical region B1. In this case, for example, the relationship between the identifier and the logical region B1 (e.g., address indicating the logical region B1) is stored in the storing unit 1b. For example, the controlling unit 1c creates the logical region B2 and then associates the identifier with the logical region B2 by changing the relationship between the identifier and the logical region B1. In this manner, the controlling unit 1c allows the information processing apparatus 2 to access the logical region B2 using the same identifier.

In operation of the storage control apparatus 1, the acquiring unit 1a acquires first information indicating the frequency of random access to the logical region B1 and second information indicating the data size of random access, based on the content of access from the information processing apparatus 2 and stores the acquired information in the storing unit 1b. The controlling unit 1c determines the size of a storage area to be allocated to the logical region B2 based on the second information indicating the data size of random access, when the first information in the storing unit 1b indicates that the frequency of random access is equal to or greater than a threshold value. The controlling unit 1c creates the logical region B2 using a plurality of storage devices. The controlling unit 1c controls access from the information processing apparatus 2 such that access is made to the logical region B2 instead of the logical region B1.

In this manner, logical regions can be tuned efficiently for random access. When the frequency of random access for a certain storage region is high, it can be determined that the logical region containing that storage region is subject to random access rather than sequential access. In this case, the performance of access to the logical region may be improved by performing tuning specific to random access. Accordingly, the proposed system is designed to find a logical region with a high frequency of random access and reforms that logical region by re-assigning storage areas with a suitable size for the data subjected to random access. Thus, the strip size can be adjusted automatically depending on the state of random access in each logical region.

Here, random access may be made to data having a relatively small size. The accessed range within a logical region may extend across a plurality of storage devices. When this is the case, the access performance is more influenced by the time for each storage device to seek the position at which data of the access destination is stored.

For example, assume that random access operations A1, A2, A3, A4, and A5 are made to five different ranges in the logical region B1. Specifically, random access A1 is directed to a range across two storage areas B11 and B12. Random access A2 is directed to a range that falls within a single storage area B12. Random access A3 is directed to a range across two storage areas B12 and B13. Random access A4 is directed to a range across two storage areas B13 and B14. Random access A5 is directed to a range that fails within a single storage area B14. When random access is made to relatively small data across two or more different storage areas as in the random access operations A1, A3, and A4, the access performance is more influenced by the time consumed by the storage devices in physically searching their storage areas to access (e.g., read) the intended data.

More specifically, when the storage devices 3, 4, 5, and 6 are magnetic disk drives, their access performance is evaluated by the summation of an access time and a data transfer time. The access time is a time from reception of a data transfer request from the information processing apparatus 2 to start of data transfer. The access time is the summation of a seek time (time for positioning the magnetic head on a desired track) and a rotational latency of disks (wait time for a desired sector on a track to come under the magnetic head). The smaller the amount of data to be transferred becomes (i.e., the shorter the data transfer time is), the more the influence of the access time (time for seeking an intended storage area) on access performance will be. For example, even though the storage devices 3 and 4 start in parallel to read data, the reading of data for the random access A1 as a whole is not completed until either of the two storage devices finishes its read operation with a slower access time. In other words, the access performance is determined by the slowest access time of all the storage devices involved. When frequent random access occurs, the increase of access time due to this overhead becomes remarkable, which makes it difficult for the striping to exhibit its full performance. In such a case, accessing only one storage device by one random access (e.g., the random access A1) is more efficient than accessing a plurality of storage devices.

Thus, the storage control apparatus 1 creates an alternative logical region B2 for use instead of the original logical region B1. For example, assume that random access operations A1a, A2a, A3a, A4a, and A5a are made to the logical region B2. These random access operations A1a, A2a, A3a, A4a, and A5a are directed to the same data ranges accessed by the foregoing random access operations A1, A2, A3, A4, and A5. Specifically, random access A1a is directed to a range within the logical region B2 which falls within a single storage area B21. Random access A2a is directed to another range within the same storage area B21. Random access A3a is directed to yet another range within the logical region B2 which extends across two storage areas B21 and B22. Random access A4a is directed to a range within a single storage area B22. Random access A5a is also directed to a range within the same storage area B22.

As compared with the original logical region B1, it is highly probable in the alternative logical region B2 that most random access operations take place within a storage area on one storage device. In other words, the possibility that random access across two or more storage areas occurs in the alternative logical region B2 is lower than that in the original logical region B1, thus shortening the access times.

In this manner, the strip size of each logical region may be efficiently adjusted for random access. In addition, access performance for the logical region may be improved.

(b) Second Embodiment

Figure 2:
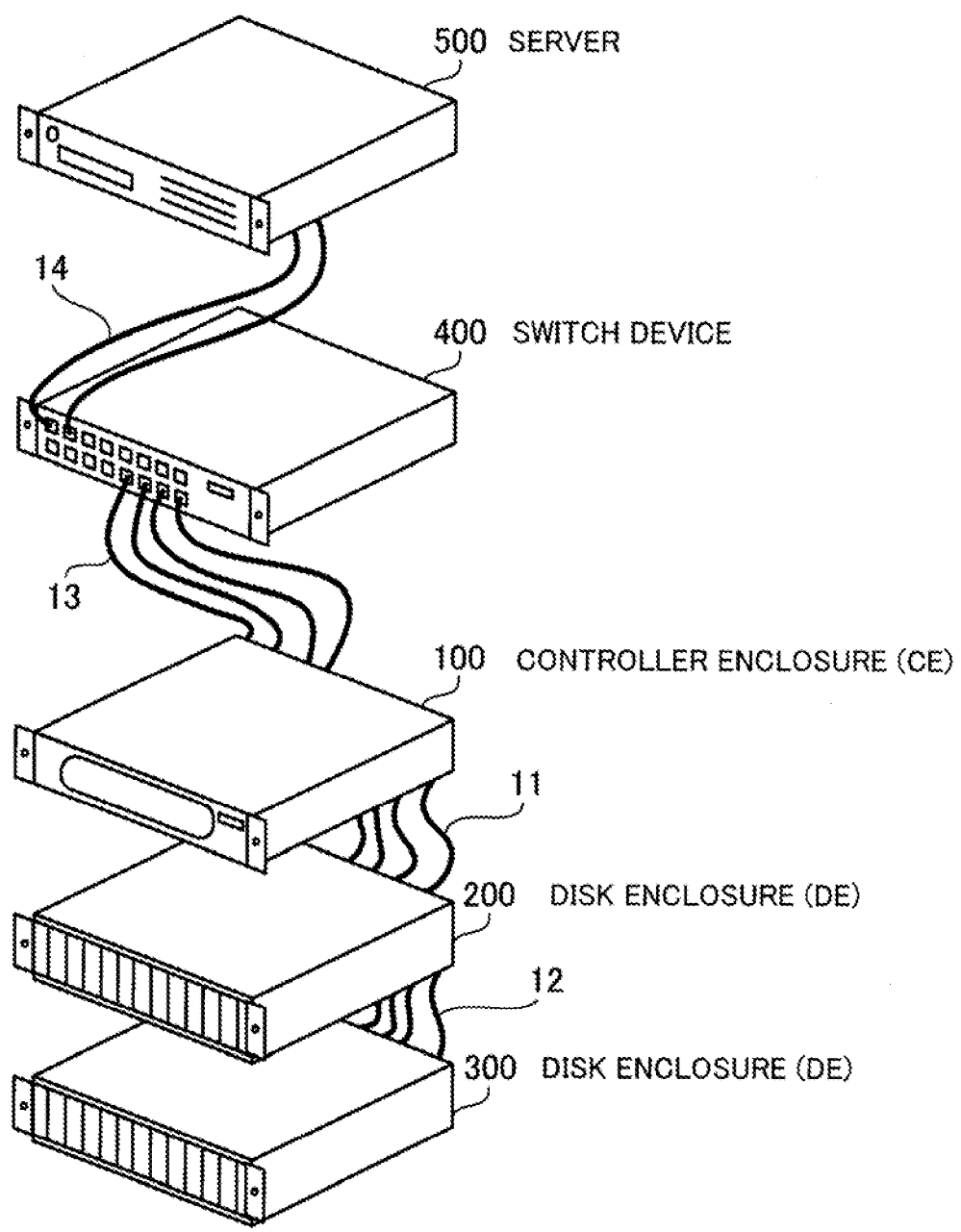
FIG. 2 illustrates a storage system according to a second embodiment.

FIG. 2 illustrates a storage system according to a second embodiment. The storage system of the second embodiment includes a controller enclosure (CE) 100 and disk enclosures (DE) 200 and 300. The CE 100 and the DE 200 are connected to each other via cables 11. The DEs 200 and 300 are connected to each other via cables 12. The CE 100 is connected to a switch device 400 via cables 13. The switch device 400 is connected to a server 500 via cables 14. As seen in FIG. 2, these cables 11, 12, 13, and 14 may be provided in plurality for parallel connections.

The cables 11 and 12 may conform to the standards of InfiniBand, FC (Fibre Channel), or the like. The cables 13 and 14 may conform to the standards of FC, SAS (Serial Attached Small Computer System Interface), iSCSI (Internet Small Computer System Interface), FCoE (Fibre Channel over Ethernet) (Ethernet is a registered trademark), or the like.

The CE 100 is a storage control apparatus that controls access from the server 500 to the DEs 200 and 300.

Each of the DEs 200 and 300 is a storage device capable of housing a plurality of disk drives therein. Each of the DEs 200 and 300 may also be called a disk shelf.

The switch device 400 is a relay device that relays communication between the CE 100 and servers including the illustrated server 500. While not explicitly depicted in FIG. 2, other server computers may be connected to the switch device 400 so that the storage system is also accessible to those server computers.

The server 500 is a server computer that accesses the storage system.

The CE 100, the DEs 200 and 300, the switch device 400, and the server 500 may foe housed in a rack. Alternatively, these devices may also be built in tower-type computer cases.

In the following description, the reference numerals of cables for connecting the devices will be omitted.

Figure 3:
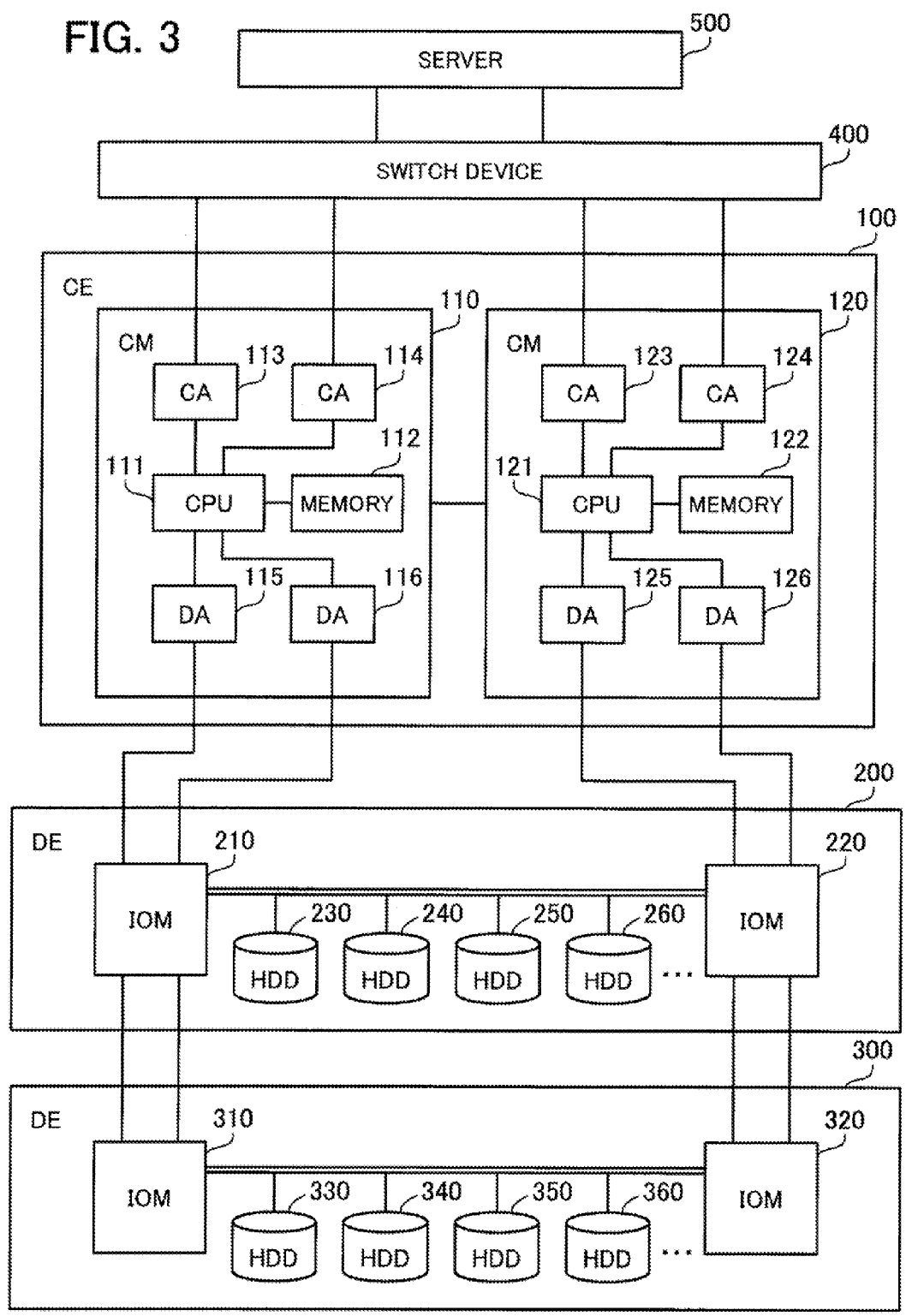
FIG. 3 illustrates exemplary hardware of a storage system.

FIG. 3 illustrates exemplary hardware of a storage system. The CE 100 has CMs (Controller Modules) 110 and 120. Each of the CMs 110 and 120 is a module that controls access from the server 500 to a plurality of disk drives provided in the DEs 200 and 300. Two CMs 110 and 120 form a duplexed system so that a plurality of accesses from the server 500 can be processed in parallel in a distributed, manner. The CMs 110 and 120 are connected to each other via an internal bus of the CE 100. The CM 110 has a CPU (Central Processing Unit) 111, a memory 112, CAs (Channel Adaptors) 113 and 114, and DAs (Disk Adaptors) 115 and 116. The CPU 111 is connected to other units via an internal bus of the CM 110.

The CPU 111 is a processor that controls information processing performed by the CM 110. The CM 110 may execute a program in a distributed manner by providing a plurality of processors.

The memory 112 includes a non-volatile memory and a volatile memory. The non-volatile memory stores firmware programs executed by the CPU 111, as well as various data used by the same. The volatile memory temporarily stores firmware programs executed by the CPU 111, as well as various data used by the same. The CM 110 may include a plurality of such memory devices.

Each of the CAs 113 and 114 is a communication interface that communicates with the server 500 via the switch device 400. The two CAs 113 and 114 provide dual redundancy. Either or both of these CAs can be activated.

Each of the DAs 115 and 116 is a communication interface that communicates with the DE 200. The two DAs 115 and 116 provides dual redundancy. Either or both of these DAs can be activated.

The other CM 120 also has a CPU 121, a memory 122, CAs 123 and 124 and DAs 125 and 126. Here, the CPU 121, the memory 122, the CAs 123 and 124, and the DAs 125 and 126 are the same as the CPU 111, the memory 112, the CAs 113 and 114, and the DAs 115 and 116, respectively, and explanation thereof will be omitted. The CPUs 111 and 121 can communicate with each other via an internal bus of the CE 100.

The DE 200 has IOMs (Input/Output Module) 210 and 220 and HDDs (Hard Disk Drive) 230, 240, 250, 260, and so on.

Each of the IOMs 210 and 220 is a module that executes write and read of data to the HDDs 230, 240, 250, 260, and so on based on the instructions given by the CE 100. For example, each of the IOMs 210 and 220 includes an ASIC (Application-Specific Integrated Circuit), an FPGA (Field-Programmable Gate Array), or the like for executing write and read operations. Each of the IOMs 210 and 220 may include a general-purpose processor for executing programs such as firmware stored in a memory provided in each of the IOMs 210 and 220. Each of the IOMs 210 and 220 also includes communication interfaces for communication with the CE 100 and a DE 300. The IOM 210 is connected to the DAs 115 and 116. The IOM 220 is connected to the DAs 125 and 126.

Each of the HDDs 230, 240, 250, 260, and so on is a disk drive that stores data used for processing performed by the server 500 or other server computers.

The DE 300 has IOMs 310 and 320 and HDDs 330, 340, 350, 360, and so on.

The IOMs 310 and 320 are the same as the IOMs 210 and 220, and explanation thereof will be omitted. Note that the IOMs 310 and 320 are connected to the IOMs 210 and 220, respectively. The CE 100 communicates with the DE 300 via the DE 200.

The HDDs 330, 340, 350, and 360 are disk drives that store data used for processing performed by the server 500 and other server computers.

In the DEs 200 and 300, a plurality of logical volumes are created on HDDs using a striping technology such as RAID level 0. Alternatively, the RAID level may be selected from RAID levels 4 to 6. Furthermore, mirroring (RAID level 1) may be combined as in RAID levels 0+1, 4+1, 5+1, 6+1, or the like.

The CE 100 may also be adapted to incorporate a plurality of local HDDs. In this case, the CMs 110 and 120 may control access from the server 500 to those HDDs in the CE 100.

The CE 100 and the DEs 200 and 300 may also include other storage devices such as SSDs (Solid State Drives; instead of HDDs or in addition to HDDs.

Figure 4:
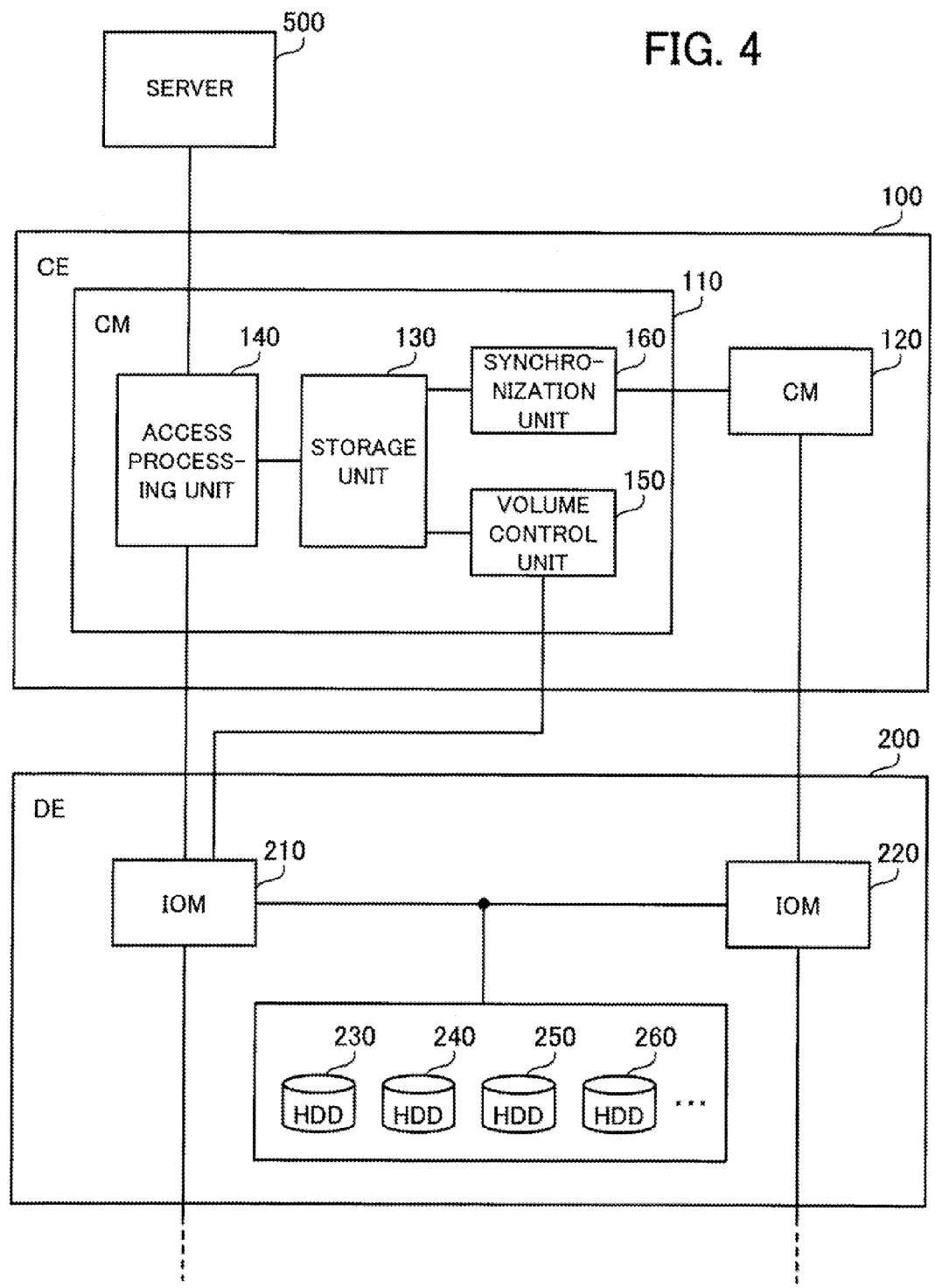
FIG. 4 illustrates exemplary software of CE.

FIG. 4 illustrates exemplary software of CE. In FIG. 4, the switch device 400 and the DE 300 are omitted. Some or all of the blocks seen in FIG. 4 may be implemented as program modules executed by the CPU 111. Some or all of the blocks seen in FIG. 4 may also be implemented as electronic circuits such as FPGA or ASIC. The CM 120 may be implemented in the same way as the CM 110. The CM 120 performs the same control as that of the CM 110 by communicating with the IOM 220.

The CM 110 has a storage unit 130, an access processing unit 140, a volume control unit 150, and a synchronization unit 160.

The storage unit 130 stores various data to be used in processing performed by the access processing unit 140, the volume control unit 150, and the synchronization unit 160. The storage unit 130 is implemented in a storage region of the memory 112.

The access processing unit 140 receives an access request (simply, "request") such as data write or data read from the server 500. The access processing unit 140 instructs the IOM 210 to execute a data-write or data-read operation in response to an access request based on information stored in the storage unit 130. The IOM 210 writes data to the HDDs 230, 240, 250, 260, and so on in response to a write instruction given by the access processing unit 140, and responds with the result of the execution of write to the access processing unit 140. The IOM 210 reads data from the HDDs 230, 240, 250, 260, and so on in response to a read instruction given by the access processing unit 140, and responds with the read data to the access processing unit 140. The access processing unit 140 responds with the result of the execution of write or the read data to the server 500.

The access processing unit may observe a series of read requests from the server 500 and consequent access activities with a particular logical volume. Based on this observation, the access processing unit 140 determines whether those access activities are either of random access or of sequential access. When the observed access activities are found to be of random access to relatively small data, the access processing unit 140 acquires information regarding the random access, and stores the acquired information in the storage unit 130 while associating it with the logical volume. The access processing unit 140 collects statistics access requests, and stores it in the storage unit 130.

The volume control unit 150 controls the change in strip size for each logical volume based on the above information stored in the storage unit 130. The volume control unit 150 instructs the IOM 210 to change the strip size. This action may be simply expressed as "the volume control unit 150 changes the strip size".

The volume control unit 150 controls the change in strip size of all HDDs in the DE 200. In other words, another volume control unit provided in the CM 120 is used as the standby system of the volume control unit 150. Alternatively, these two volume control units may be both active so as to share the workload of controlling the strip size in HDDs and logical volumes.

The synchronization unit 160 synchronizes data with the CM 120 for the purpose of information sharing. More specifically, the CM 110 stores information in its local storage unit 130, as does the peer CM 120 in its own storage unit. Some pieces of the stored information is common, while the others are different. The synchronization unit 160 exchanges the latter information (i.e., the differences) with its counterpart in the peer CM 120, so that the two storage units store the same information. The synchronization may be performed at predetermined intervals (e.g., 1 min, 10 mins, 30 mins), or may be invoked each time an update is made to the information that needs synchronization.

Figure 5:
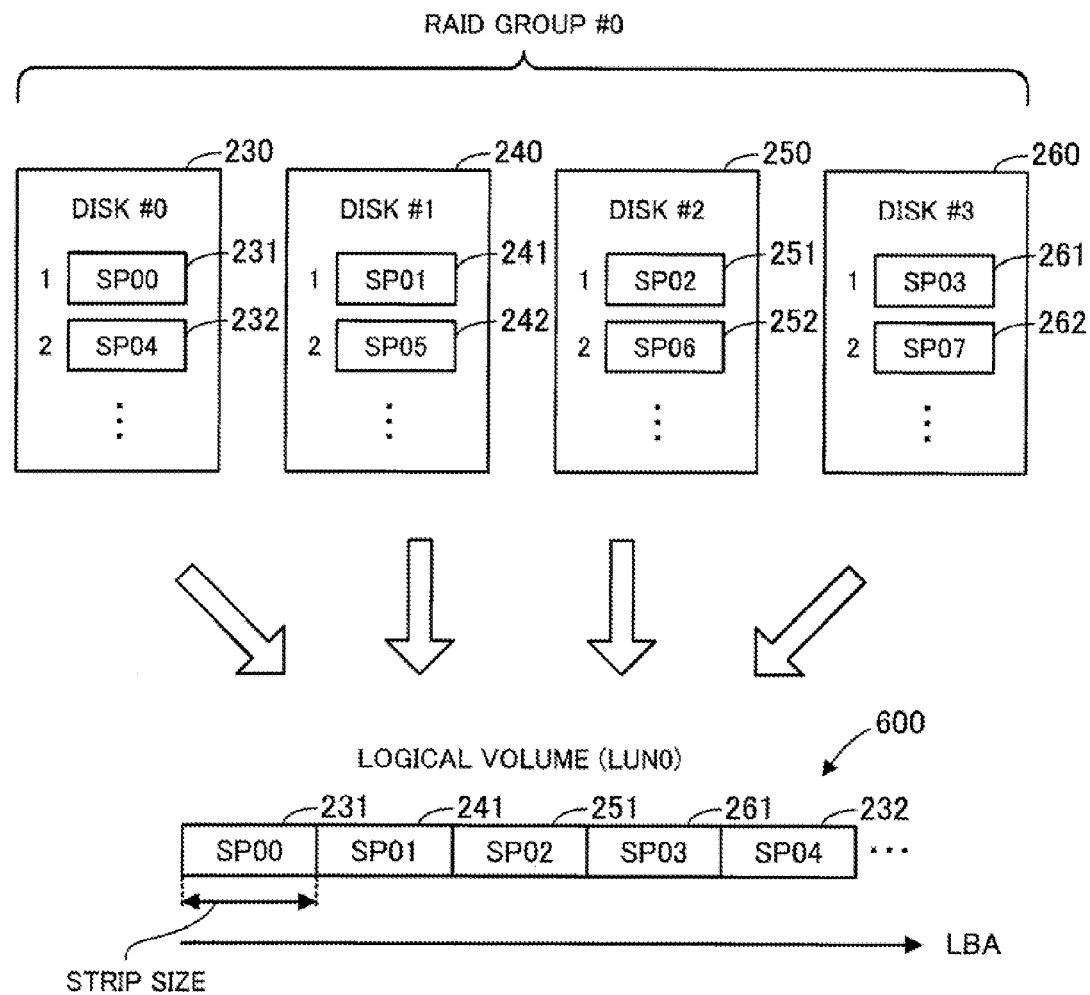
FIG. 5 illustrates an exemplary logical volume.

FIG. 5 illustrates an exemplary logical volume. A logical volume 600 is a logical region created by applying striping (RAID level 0) to the HDDs 230, 240, 250, and 260. Such a logical region may also be called an LU (Logical Unit). Here, the RAID drives are managed on a "RAID group" basis. For example, the illustrated HDDs 230, 240, 250, and 260 belong to RAID group #0. For identification purposes, a disk number is assigned to each of the HDDs 230, 240, 250, and 260. The HDD 230 is disk #0. The HDD 240 is disk #1. The HDD 250 is disk #2. The HDD 260 is disk #3.

A logical unit number (LUN) is used as an identifier for identifying a logical volume in the storage system. For example, the logical volume 600 is referred to as LUN 0.

Each divided storage area on the HDDs 230, 240, 250, and 260 may be called a "strip". The logical volume 600 is a set of strip-sized storage areas on the HDDs 230, 240, 250, and 260.

The HDD 230 has strips 231, 232, and so on. The identifier of the strip 231 is "SP00". The identifier of the strip 232 is "SP04".

The HDD 240 has strips 241, 242, and so on. The identifier of the strip 241 is "SP01". The identifier of the strip 242 is "SP05".

The HDD 250 has strips 251, 252, and so on. The identifier of the strip 251 is "SP02". The identifier of the strip 252 is "SP06".

The HDD 260 has strips 261, 262, and so on. The identifier of the strip 261 is "SP03". The identifier of the strip 262 is "SP07".

The logical volume 600 is a set of these strips. More specifically, the logical volume 600 includes the strips 231, 241, 251, 261, 232, and so on. The sequence of strips is in the order of logical block addressing (LBA) indicating a location in the logical volume 600. The leading LBA of the logical volume 600 is the leading LBA of the strip 231. The LBA next to the last LBA of the strip 231 is the leading LBA of the strip 241. The LBA next to the last LBA of the strip 261 is the leading LBA of the strip 232.

In the example of FIG. 5, the logical region formed from strips 231, 241, 251, and 261 makes one stripe (stripe "1"). Thus, the size of one stripe (also referred to as "stripe width") is four times the strip size. Similarly the logical region formed from strips 232, 242, 252, and 262 makes another stripe (stripe "2").

The logical volume 600 is a logical region in which one or more of the stripes are combined. The size of the logical volume 600 is the product of the stripe width and the number of stripes.

FIG. 6 illustrates an exemplary read request. A read request 700 is generated by the server 500 and is transmitted to the CE 100. The read request 700 includes fields of LUN, offset from head of logical volume, and the number of read bytes.

Contained in the field of LUN is an LUN per se or other information designating a logical volume storing data to be read. One possible substitute for LUN is a predetermined logical volume name that is managed by the CE 100 by associating it with LUN. In the field of offset from head of logical volume, an LBA value is set to indicate at which position in the logical volume to start the reading. The LBA value designated herein is a relative LBA (offset) with respect to the leading LBA of the logical volume. In the field of the number of read bytes, the size of data to be read from the offset is set.

For example, the read request 700 may specify "678" for the offset from the head of a logical volume and "72 KB (kilobytes)" for the number of read bytes. In the following description, an offset from the head of a logical volume may be simply referred to as an "offset".

Figure 7:
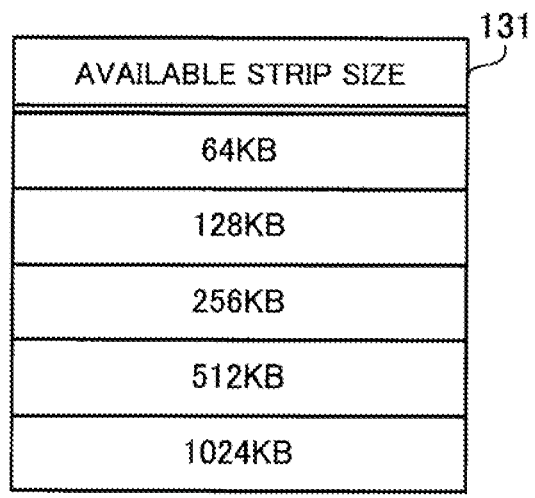
FIG. 7 illustrates exemplary available strip sizes.

FIG. 7 illustrates exemplary available strip sizes. The illustrated available strip size list 131 is a list of available (applicable) strip sizes, which, is stored in the storage unit 130 in advance as readily understood from FIG. 7. The available strip sizes may also be managed without using such a list form. In this example, the minimum value of the strip size is 64 KB and the maximum value of the same is 1024 KB. Other strip sizes are integer multiples of the minimum value. Examples of available strip size include 64 KB, 128 KB, 256 KB, 512 KB, and 1024 KB.

FIG. 8 illustrates an exemplary RAID group management table. A RAID group management table 132 is stored in the storage unit 130. The RAID group management table 132 includes items of RAID group, disk number, and the number of LBAs.

A RAID group number is registered in the item of RAID group. The disk number of an HDD belonging to a RAID group indicated by the RAID group number is registered in the item of disk number. The total number of LBAs in a RAID group indicated by the RAID group number is registered in the item of the number of LBAs. One LBA corresponds to one sector on the HDD. Thus, the number obtained by multiplying the size of one sector by the number of LBAs is a storage capacity that is available for the RAID group.

For example, information such as a RAID group of "0", a disk number of "0, 1, 2, 3", and the number of LBAs of "524288" is registered in the RAID group management table 132. This indicates the fact that the HDDs 230, 240, 250, and 260 having disk numbers of #0, #1, #2, and #3, respectively, belong to RAID group #0 with a size of 524288 LBA blocks. For example, when the size of one sector is 512 B, the total storage capacity of 268 MB (megabytes), or 512 B by 524288, is available for the RAID group #0.

FIG. 9 illustrates an exemplary logical volume management table. A logical volume management table 133 is stored in the storage unit 130. The logical volume management table 133 includes items of LUN, RAID group, the leading LBA, and the total number of LBAs.

An LUN is registered in the item of LUN. The RAID group number of a RAID group to which the logical volume belongs is registered in the item of RAID group. The leading LBA of the logical volume is registered in the item of the leading LBA. The total number of LBAs in the logical volume is registered in the item ox the total number of LBAs.

For example, a record composed of an LUN of "0", RAID group of "0", leading LBA of "0", and the total number "131072" of LBAs is registered in the logical volume management table 133. This indicates the fact that the logical volume 600 identified by LUN 0 belongs to RAID group #0, and that a region "with a total size of 131072" LBA blocks is secured by setting the LBA "0" of the RAID group as its start point. For example, when the size of one sector is 512 B, the total storage capacity of 67 MB, or 512 B by 131072, is available in the logical volume 600.

A plurality of logical volumes may be created in one LAID group. On the logical volume management table 133, another logical volume LUN1 is also present in the RAID group #0.

FIG. 10 illustrates an exemplary access management table. An access management table 134 is stored in the storage unit 130. The access management table 134 includes items named "RAID group," "LUN", "total access count", "random access count", "average read byte count", "strip size", and "adjustment flag".

A RAID group number is registered in the item of RAID group. LUN of a logical volume is registered in the item of LUN. The total number of access operations for reading the logical volume is registered in the item of the total access count. The number of random access operations for reading the logical volume is registered in the item of random access count. The total number of access operations and the number of random access operations are counted each time a read request is received. Note that the number of random access operations is counted when the read request satisfies a predetermined condition described below. The average number of read bytes counted as random access is registered in the item of average read byte count. The current strip size of the logical volume is registered in the item of strip size. A flag indicating whether or not to tune the strip size of the logical volume is registered in the item of adjustment flag. A flag value of "true" indicates that the strip size of the logical volume is to be tuned. A flag value of "false" indicates that the strip size of the logical volume is not to be tuned.

For example, the first entry of the access management table 134 contains information such as a RAID group of "0", an LUN of "0", the total access count of "61287", the random access count of "55817", the average read, byte count of "78 KB", a strip size of "128 KB", and an adjustment flag of "true". This table entry indicates the fact that the logical volume 600 identified by its LUN of 0 in RAID group #0 received 61237 read requests, of which 55817 were random read access to data of 78 KB on average. The same entry further indicates that the current strip size is 128 KB, and is subject to tuning. Here, when the size of the logical volume 600 is, for example, 67 MB, the total number of strips in the logical volume 600 is about 524, which is a quotient obtained by dividing 67 MB by 128 KB.

Figure 11:
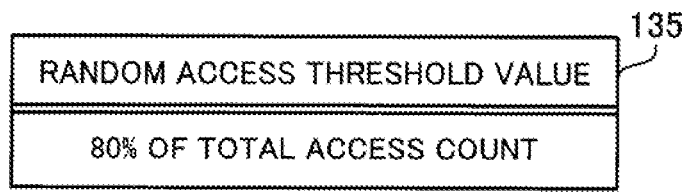
FIG. 11 illustrates an exemplary random access threshold value.

FIG. 11 illustrates an exemplary random access threshold value. A random access threshold value 135 is stored in the storage unit 130. The random access threshold value 135 is a parameter for use in determining whether or not the strip size of a logical volume is to be tuned. For example, information indicating "80% of total access count" is registered as the random access threshold value 135. This indicates the fact that the strip sire of a logical volume is to be tuned when the random access shares 80% or more of the total access count. Note that the random access threshold value 135 may be changed to a different value depending on the operation of the storage system. While FIG. 11 illustrates only one random access threshold value 135, different threshold values may be registered for different logical volumes.

FIG. 12 illustrates an exemplary access statistics table. An access statistics table 136 is stored in the storage unit 130. The access statistics table 136 includes items of RAID group, LUN, day of the week, time zone, and access count. A RAID group number is registered in the item of RAID group. The LUN of a logical volume is registered in the items of LUN. A day of the week is registered in the item of day of the week. A time zone (e.g., a per-hour basis) is registered in the item of time zone. The total access count in the time zone of the day of the week is registered in the item of access count.

For example, information such as a RAID group of "0", an LUN of "0", a day of the week of "Mon", a time zone of "0:00", and the access count of "5237" is registered in the access statistics table 136. This indicates the fact that 5237 access activities took place in the logical volume 600 identified by its LUN of 0 in the RAID group #0 during the time from 0:00:00 to 0:59:59 on Monday.

Note that the access statistics may be expressed in various ways, other than on a day-of-the-week basis. For example, the data may be summarized by date, week (as in "first week", "second week" . . . ), or any other chronological intervals. Also, the duration of time zones is not limited to one hour, but may instead be two, three, or six hours, for example.

Figure 13:
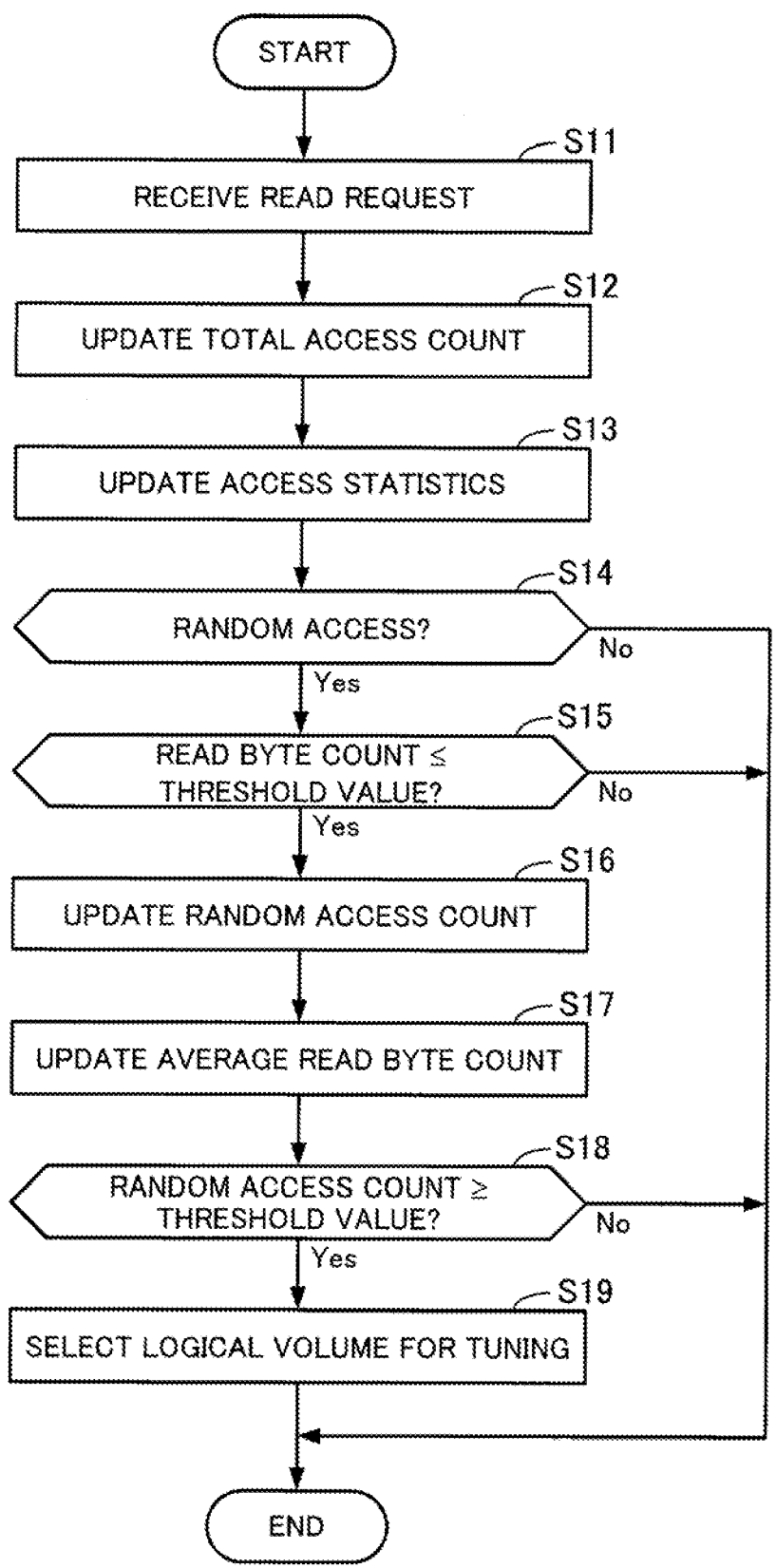
FIG. 13 is a flowchart illustrating an exemplary processing upon reception of read access.

FIG. 13 is a flowchart illustrating an exemplary processing upon reception of read access. Hereinafter, a description will be given of the processing illustrated in FIG. 13 along with step numbers.

(Step S11) The access processing unit 140 receives a read request 700 from the server 500. The access processing unit 140 instructs the DE 200 to read data, in response to the read request 700. When the access processing unit 140 acquires the read data from the DE 200, the access processing unit 140 responds with the acquired data to the server 500. Note that the access processing unit 140 may determine from which strip the data is to be read, by carrying out a predetermined calculation based on the current strip size or the number of HDDs used in the striping.

(Step S12) The access processing unit 140 updates the total access count corresponding to the logical volume 600 (LUN 0) designated by the read request 700 in the access management table 134 stored in the storage unit 130. More specifically, one is added to the total access count corresponding to LUN 0.

(Step S13) The access processing unit 140 updates the access count corresponding to the current day of the week and time zone in the access statistics table 136 stored in the storage unit 130. More specifically, one is added to the access count corresponding to the current date and time zone.

(Step S14) The access processing unit 140 determines whether or not the read request 700 is random access. When the read request 700 is random access, the process advances to step S15. When the read request 700 is not random access (when the read request 700 is sequential access), the process ends. The access processing unit 140 determines whether or not the read request 700 is random access by comparing the current read request 700 with the immediately previous read request to the same LUN 0. More specifically, when the value obtained by adding LBA corresponding to the number of previously read bytes to the previous offset matches the offset designated by the read request 700, the read request 700 is sequential access. When not matched, the read request 700 is random access. For example, when the size of one sector is 512 B, LBA corresponding to the number of previously read bytes is the quotient obtained by dividing the number of previously read bytes by 512 B.

(Step S15) The access processing unit 140 determines whether or not the number of read bytes (also referred to as "access size") designated by the read request 700 is equal to or less than a threshold value. When the number of read bytes is equal to or less than the threshold value, the process advances to step S16. When the number of read bytes is greater than the threshold value, the process ends. Here, the threshold value used in step S15 is 1/n (n is a real number greater than one) of the maximum value of the available strip size, for example, according to the available strip size list 131, the maximum value of the available strip size is 1024 KB. For example, when n is two, the threshold value used in step S15 is 512 KB, which is obtained by dividing 1024 KB by two.

(Step S16) The access processing unit 140 updates the random access count corresponding to the logical volume 600 designated by the read request 700 in the access management table 134. More specifically, one is added to the random access count corresponding to LUN 0.

(Step S17) The access processing unit 140 updates the average number of read bytes corresponding to LUN 0 in the access management table 134 to reflect the number of read bytes designated by the read request 700.

(Step S18) The access processing unit 140 determines whether or not the random access count for the logical volume 600 designated by the read request 700 is equal to or greater than a threshold value, with reference to the access management table 134. When the random access count is equal to or greater than the threshold value, the process advances to step S19. When the random access count is less than the threshold value, the process ends. Here, the threshold value used in step S18 is the random access threshold value 135 (80% of the total access count) stored in the storage unit 130.

(Step S13) The access processing unit 140 selects the logical volume 600 designated by the read request 700 as a subject of tuning in the access management table 134 stored in the storage unit 130. More specifically, the adjustment flag is changed from "false" to "true". In this manner, the logical volume 600 is registered as a target of the strip size tuning.

In this manner, the access processing unit 140 determines randomness of access activities each time a read request 700 is received from the server 500, thereby determining the necessity of changing strip sizes. When the access management table 134 is updated, the synchronization unit 160 provides the updated contents to the CM 120 so as to share the information. The reason for this is to enable the CM 120 to perform tuning of the strip size even when a failure occurs in the CM 110.

The volume control unit 150 determines a tuning schedule based on the access statistics table 136 stored in the storage unit 130. Next, a description will be given of the procedure for determining a tuning schedule. For example, when a new need arises for tuning of a logical volume, the volume control unit 150 executes the following procedure for the logical volume. The following procedure may also be collectively executed for logical volumes at predetermined intervals (e.g., daily or weekly).

Figure 14:
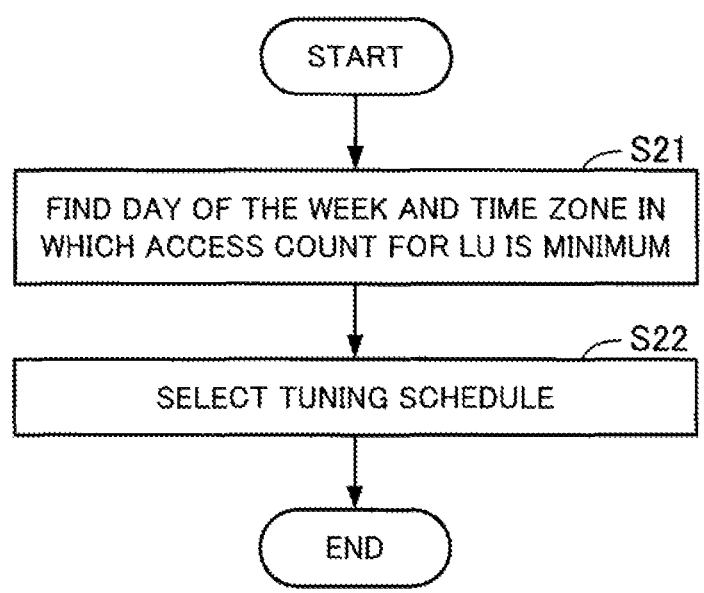
FIG. 14 is a flowchart illustrating exemplary determination of a tuning schedule.

FIG. 14 is a flowchart illustrating exemplary determination of a tuning schedule. Hereinafter, a description will be given of the processing illustrated in FIG. 14 along with step numbers.

(Step S21) The volume control unit 150 finds the day of the week and time zone in which the number of access operations made to the logical volume 600 (LUN 0) to be tuned hits the minimum, with reference to the access statistics table 136 stored in the storage unit 130.

(Step S22) The volume control unit 150 selects the day of the week and time zone found in step S21 as the tuning schedule for the logical volume 600. For example, the volume control unit 150 creates information in which the tuning schedule is associated with the logical volume 600 and stores the information in the storage unit 130.

In this manner, the volume control unit 150 determines a tuning schedule for each logical volume. Tuning is performed at a particular time zone in which the load on the logical volume is likely to be minimum, so that the influence of tuning processing with respect to access from the server 500 to the logical volume can be reduced. The volume control unit 150 executes the following procedure when the scheduled time for the logical volume 600 is reached, to change the strip sire of the logical volume 600.

Figure 15:
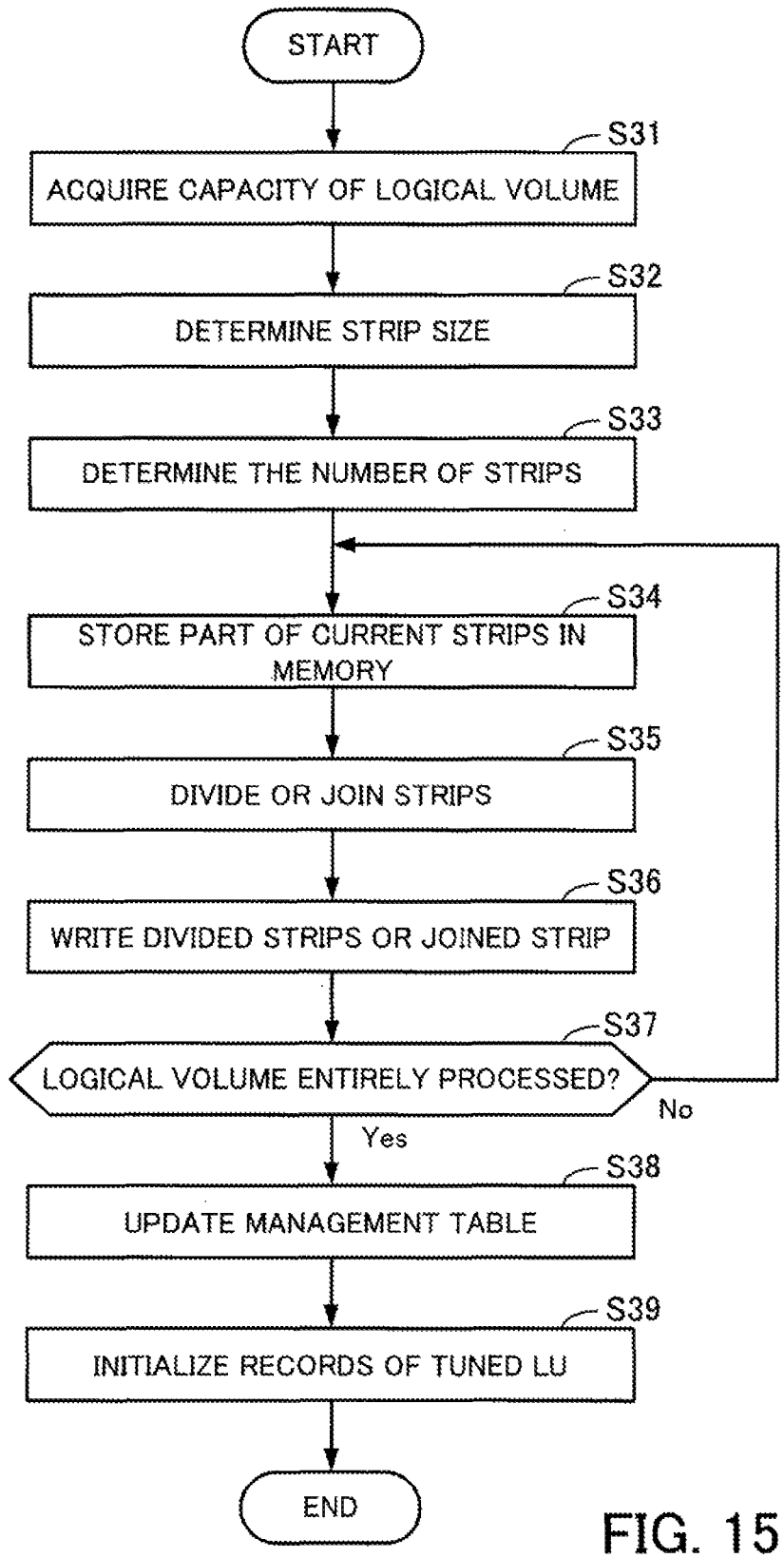
FIG. 15 is a flowchart illustrating an exemplary tuning processing.

FIG. 15 is a flowchart illustrating an exemplary tuning processing. Hereinafter, a description will be given of the processing illustrated in FIG. 15 along with step numbers.

(Step S31) The volume control unit 150 obtains the capacity of the logical volume 600. As described above, the capacity of the logical volume 600 is, for example, about 67 MB.

(Step S32) The volume control unit 150 determines a new strip size. As previously mentioned in step S15 of FIG. 13, the threshold value of the access size for detecting relatively small random access is 1/n of the maximum available strip size. Thus, in step S32, a new strip size for the logical volume 600 is determined to be the smallest available strip size greater than n times the average read byte count registered in the access management table 134. For example, when half of the maximum available strip size is used as a threshold value in step S15, the smallest available strip size greater than two times the average read byte count is selected as a new strip size. More specifically, according to the access management table 134, the average read byte count for the logical volume 600 is 78 KB. When n is 2, 156 KB is obtained by multiplying 78 KB by 2. Then the available strip size list 131 indicates that the smallest available strip size greater than 156 KB is 256 KB. In this case, the new strip size (256 KB) is greater than the current strip size (128 KB). That is, the strips will be expanded. In other cases, the newly determined strip size may be smaller than the current strip; size, meaning that the strips will shrink.

(Step S33) The volume control unit 150 determines a new number of strips, based on the results obtained in steps S31 and S32. For example, the capacity of the logical volume 600 is about 67 MB. As the new strip size is 256 KB, the number of strips is calculated to be about 262 (obtained by dividing 67 MB by 256 KB).

(Step S34) The volume control unit 150 sends a part of the current strips in the logical volume 600 to a work area in the memory 112. These strips are selected from among those that have not undergone steps 335 and 336.

(Step S35) The volume control unit 150 divides or joins the strips stored in the memory 112 to thereby generate a strip (s) having a strip size determined in step S32. In the example discussed in step S33, the new strip size (256 KB) is twice the current strip size (128 KB). Thus, a single new strip is created by joining two current strips. For example, the strips 231 and 241 are joined into a single strip. Also, the strips 251 and 261 are joined into a single strip. The volume control unit 150 coordinates this process such that data to be stored in a new strip will have the same LBA offset as its counterpart in the original strip. In other words, the offset of data in a logical volume is maintained regardless of the change in the strip size. Furthermore, when a new strip size is determined to be 1.5 times or 2.5 times the current strip size, three strips or five strips are joined together and then divided into halves to achieve the determined strip size. When the strip size is reduced, a single original strip (or joined original strips) may be divided into a determined strip size.

(Step S36) The volume control unit 150 writes the strip (s) generated in step S35 to the HDDs 230, 240, 250, and 260. The write position may be a vacant region in the HDDs 230, 240, 250, and 260. Alternatively, the strip(s) may be overwritten in the region where the original strip was present. Furthermore, the storage position of the logical volume 600 may be changed to another RAID group.

(Step S37) The volume control unit 150 determines whether or not the above steps S35 and S36 have been completed for all the strips in the logical volume 600. When steps S35 and S36 have been completed for all the strips, the process advances to step S38. When there is a strip that has not yet undergone steps S35 and S36, the process returns to step S34.

(Step S38) The volume control unit 150 changes the strip size of the logical volume 600 to 256 KB in the access management table 134. Hereinafter, the access processing unit 140 uses 256 KB as the strip sire in locating the access destination strip in the logical volume 600. Furthermore, when the write position in LUN 0 is changed to another LBA range in step S36, a new LBA range is registered in LUN 0 by updating the logical volume management table 133 (the leading LBA is changed). When the RAID group is changed, that change is also reflected. In this manner, the tuned LUN 0 becomes accessible.

(Step S39) The volume control unit 150 initializes the records of the tuned LUN 0 in the access management table 134. More specifically, the total access count and the random access count are reset to "0". The average read byte count is set to "0 B". The adjustment flag is set to "false".

In this manner, the volume control unit 150 performs tuning of the sire of strips for each logical volume.

The reason why the available strip size is n times the average read byte count in step S32 is as follows. The smaller the average read byte count is, the more appropriate it will be to use a greater coefficient in determining a new strip size. The resulting new strip sire is expected to improve the access efficiency, thus providing an advantage over the current strip size. As an alternative method, step S32 may be modified such that the strip size is tuned to be m times the average read byte count. Here, the coefficient m is a real number greater than one and may be different from n used in step S15. For example, n may be three in step S15, and m may be two in step S32.

Nest, a specific example of tuning will be described.

Figure 16:
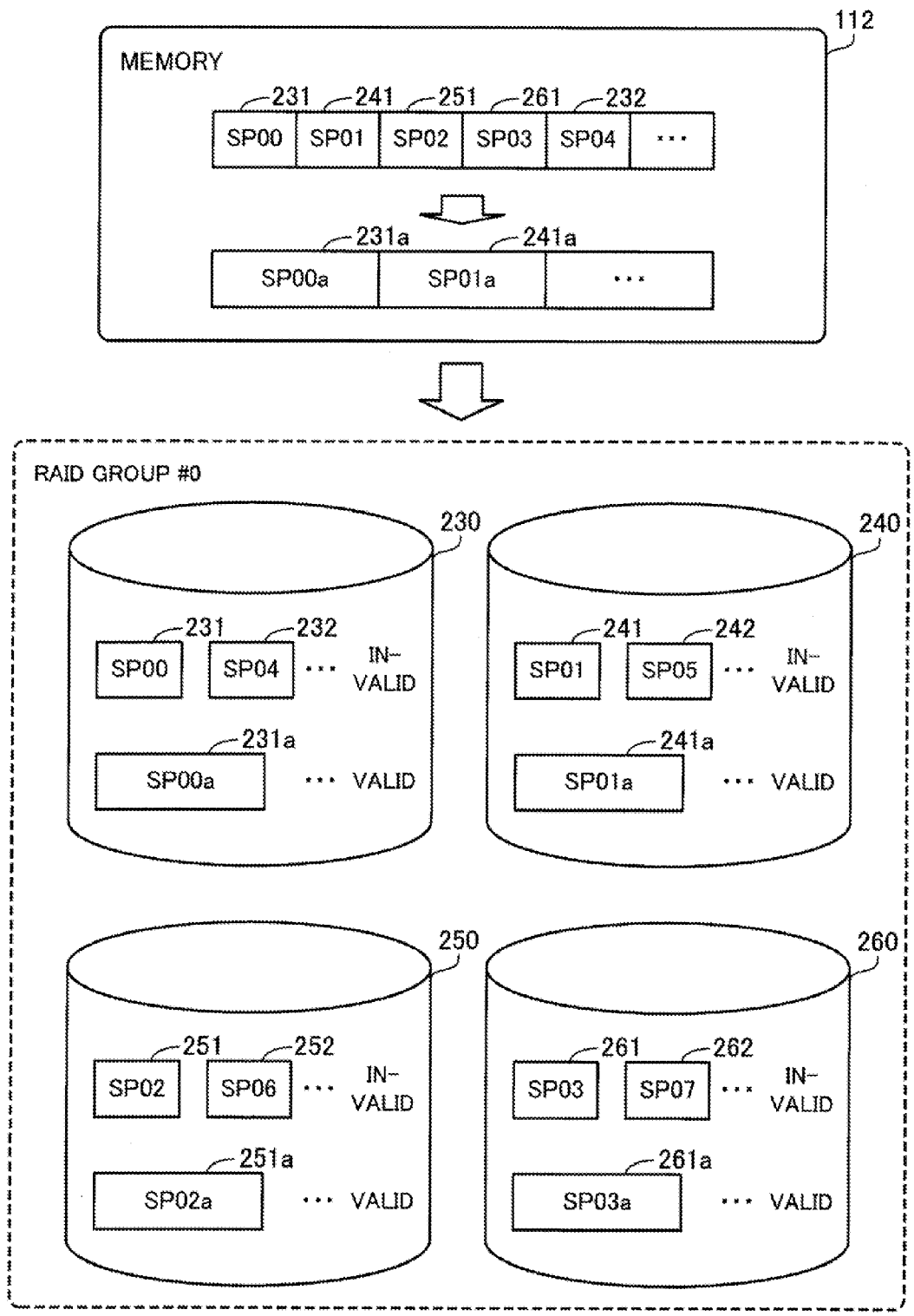
FIG. 16 illustrates a first specific example of tuning.

FIG. 16 illustrates a first specific example of tuning. FIG. 16 illustrates the case where the strip size is doubled.

The volume control unit 150 stores a part of a logical volume 600 in the memory 112. For example, the memory 112 stores strips 231, 241, 251, 261, 232, and so on. The volume control unit 150 joins the current strips as follows to thereby generate a new strip.

Specifically, the strips 231 and 241 are joined together into a new strip 231a. The identifier of this strip 231a is "SP00a". The strips 251 and 261 are joined together into another new strip 241a. The identifier of this strip 241a is "SP01a". The strips 232 and 242 are joined together into yet another new strip 251a. The identifier of this strip 231a is "SP02a". The strips 252 and 262 are joined together into still another new strip 261a. The identifier of this strip 261a is "SP03a". In this manner, the successive strips in the logical volume 600 are joined together to generate new strips.

The volume control unit 150 stores the generated strips in the HDDs 230, 240, 250, and 260 while maintaining the LBA sequence. The HDD 230 stores the strip 231a. The HDD 240 stores the strip 241a. The HDD 250 stores the strip 251a. The HDD 260 stores the strip 261a. Other strips are also stored in the HDDs 230, 240, 250, and 260 in sequence.

Then, the volume control unit 150 invalidates the original strips 231, 232, 241, 242, 251, 252, 261, 262, and so on and validates the tuned strips 231a, 241a, 251a, 261a, and so on.

In this manner, the volume control unit 150 determines the number of strips so as to maintain the current size of the logical volume even after the tuning is made. Without this feature, an increased strip size would result in a larger logical volume. The noted feature of the volume control unit 150 avoids causing such expansion of logical volumes, thus preventing the RAID group from exhaustion of storage resources.

Also, the volume control unit 150 acquires the offset of data stored in the logical volume 600 with respect to the leading LBA of the logical, volume 600 and then creates a tuned logical volume so as to maintain the offset. Thus, the LBA of the tuned logical volume can be readily designated by changing the leading LBA of the logical volume 600 (LUN 0) in the logical volume management table 133. In other words, the processing for updating the correspondence relationship between the logical volume 600 and LBA is readily performed. The server 500 is allowed to continue making access to the logical volume 600 without the need for considering the change in strip size of the logical volume 600.

Figure 17:
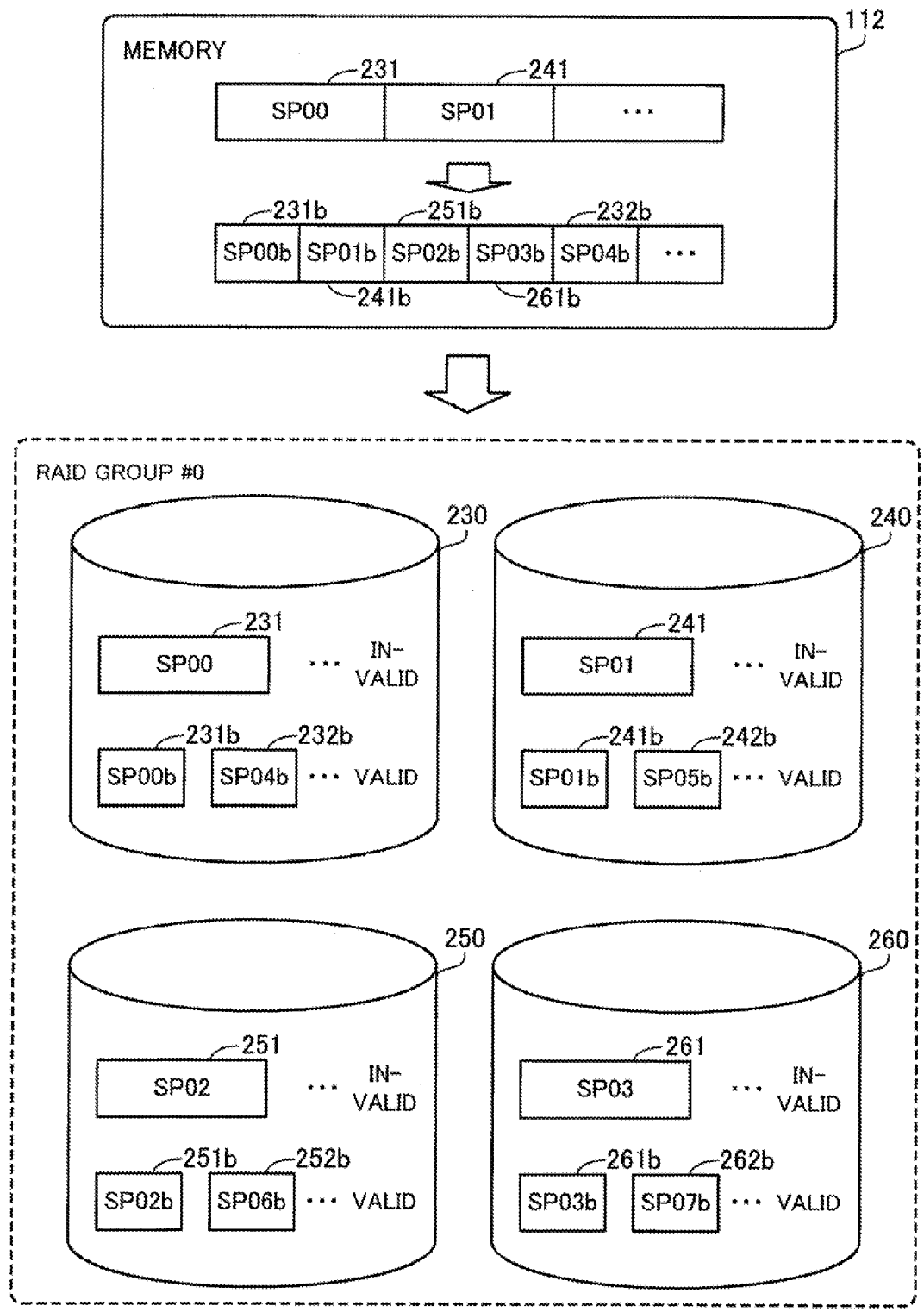
FIG. 17 illustrates a second specific example of tuning.

FIG. 17 illustrates a second specific example of tuning. Particularly, FIG. 17 illustrates the case where the strip size is reduced by half.

The volume control unit 150 stores a part of the logical volume 600 in the memory 112. For example, the memory 112 stores strips 231, 232, and so on. The volume control unit 150 divides the current strip as follows to thereby generate new strips.

Specifically, the first strip 231 is divided into two strips 231b and 241b. The identifier of the former strip 231b is "SP00b". The identifier of the latter strip 241b is "SP01b". The next strip 241 is also divided into two strips 251b and 261b. The identifier of the former strip 251b is "SP02b". The identifier of the latter strip 261b is "SP03b" The next strip 251 is divided similarly into two strips 232b and 242b. The identifier of the former strip 232b is "SP04b". The identifier of the latter strip 242b is "SP05b". The next strip 261 is divided into two strips 252b and 262b. The identifier of the former strip 252b is "SP06b". The identifier of the latter strip 262b is "SP07b". In this manner, successive strips in the logical volume 600 are divided to generate new strips.

The volume control unit 150 stores the generated strips in the HDDs 230, 240, 250, and 260 while maintaining the LBA sequence. The HDD 230 stores the strips 231b and 232b. The HDD 240 stores the strips 241b and 242b. The HDD 250 stores the strips 251b and 252b. The HDD 260 stores the strips 261b and 262b. Other strips are also stored in the HDDs 230, 240, 250, and 260 in sequence.

Then, the volume control unit 150 invalidates the original strips 231, 241, 251, 261, and so on and validates the tuned strips 231b, 232b, 241b, 242b, 251b, 252b, 261b, 262b, and so on.

In this manner, the volume control unit 150 reduces the strip size when the strip size is sufficiently larger than the data size of random access. This feature decreases concentration of access to one HDD. Note that the usage of the logical volume 600 and access characteristics (e.g., the data size of random access) may change with time. In other words, even though the strip sire may be increased by tuning, the tuned strip size does not necessarily continue to be suitable throughout the future.

In contrast, the CE 100 can efficiently tune the size of a strip for each logical volume depending on the characteristics of random access to logical volumes, and the performance of random access is improved accordingly. Furthermore, the strip size can be tuned automatically for each logical region.

Although, in the above example, only read requests are used for identifying the characteristics of random access, write requests may similarly be used instead of read requests. It is also possible to use write requests in combination with read requests.

In the above example, a plurality of strips, or physical storage areas, are bundled into a logical volume for use by the server 500. In other words, this logical volume serves as a layer placed between the server 500 and the physical storage areas. Such logical volumes may also be organized in a multiple-layer structure to realize various functions in the storage system.

Figure 18:
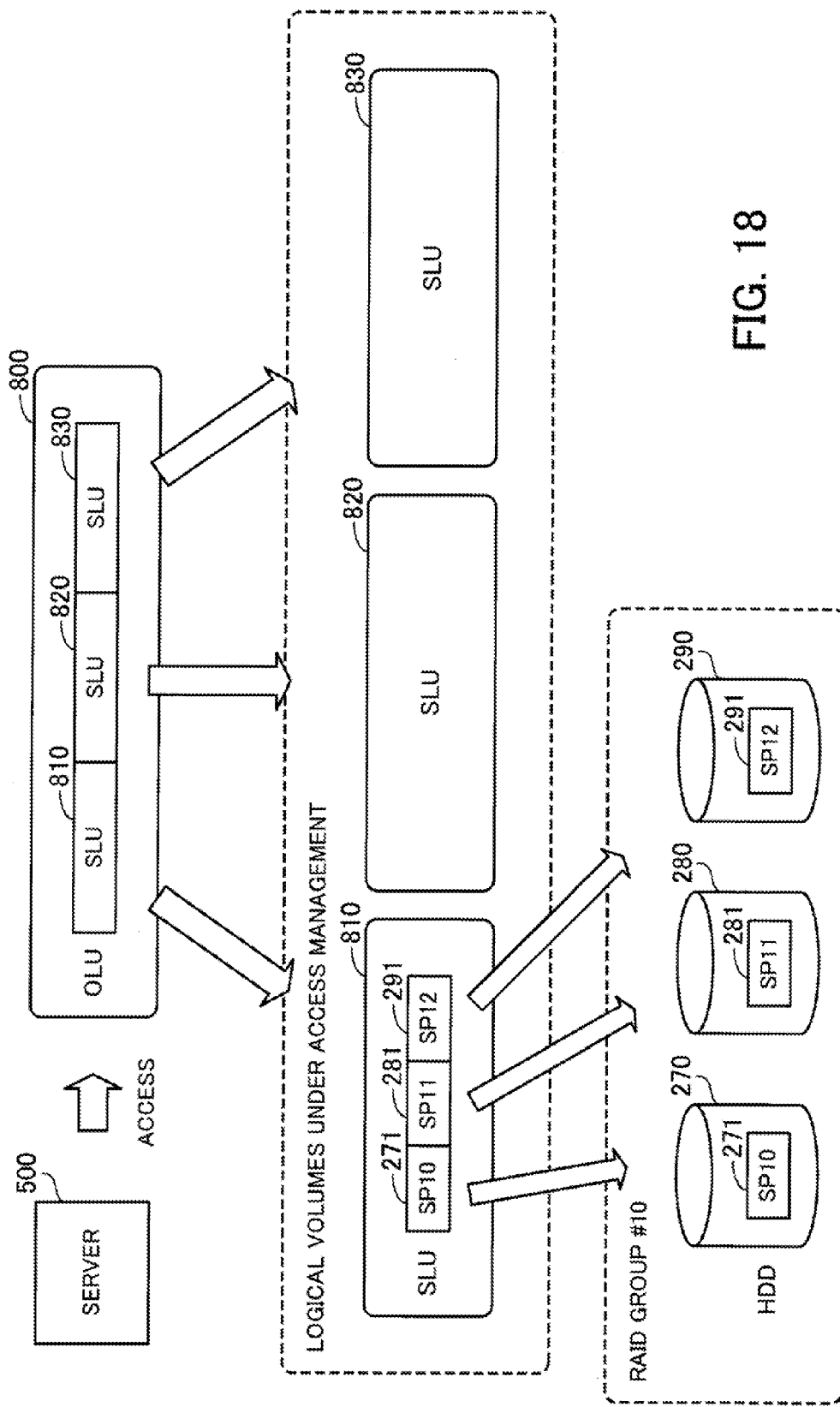
FIG. 18 illustrates another exemplary logical volume.

FIG. 18 illustrates another exemplary logical volume. In FIG. 18, a RAID group #10 is illustrated by way of example. HDDs 270, 280, and 290 belong to the RAID group #10.

The HDD 270 has a strip 271 with an identifier of "SP10". The HDD 280 has a strip 281 with an identifier of "SP11". The HDD 290 has a strip 291 with an identifier of "SP12".

Here, FIG. 18 illustrates the case where a logical volume is provided in the form of a two-layer structure. For example, the server 500 accesses an OLU (Open Logical Unit) 800. The OLU 800 is a logical volume in one layer. A plurality of SLUs (Shared Logical Unit) 810, 320, and 330 are assigned to the OLU 300.

The SLUs 810, 820, and 830 are logical volumes in another layer. The above-noted strips 271, 281, and 291 are assigned to the leftmost SLU 810 in FIG. 18. Likewise, other strips (not depicted) in one of RAID groups are assigned to the other two SLUs 820 and 830.

In this manner, first-layer logical volumes (SLU) is created by bundling a plurality of strips, and a second-layer logical volume (OLU) is created by bundling a plurality of such first-layer logical volumes (SLUs). In this case, the CE 100 manages the relationship between RAID groups and SLUs, as well as the relationship between SLUs and OLUs. The server 500 transmits a write request or a read request to the CE 100, with a designation of a specific OLU 800. The CE 100 then accesses relevant HDDs by tracing the layer structure.

Although the logical volumes are managed in a different manner, the change in strip size may similarly be made as in the foregoing description. To this end, the CE 100 may create information equivalent to the access management table 134 for the individual SLUs 810, 820, and 830. In this manner, the tuning may be made on an individual SLU basis, depending on the characteristics of random access. In other words, even when the logical volumes are organized in a multiple-layer structure, the strip size of each logical volume at the lowest level (where strips are bundled) can be efficiently tuned according to the characteristics of random access to logical volumes.

Various embodiments have been disclosed above. According to one aspect of those embodiments, logical regions can be efficiently tuned for random access.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A storage control apparatus for use in controlling access from an information processing apparatus to a logical region in which a first storage area of a first size is allocated from each of a plurality of storage devices, the storage control apparatus comprising:
   a processor that performs a procedure including:
   counting a count of random access operations to a first logical region and a total access count which is a sum of a count of sequential access operations to the first logical region and the count of random access operations;
   acquiring an average size of a plurality of data records accessed in the first logical region per random access operation;
   determining a second size of each of a plurality of second storage areas to be allocated to a second logical region based on the average size, the second size being larger than the first size and being assignable within a single storage device, and creating the second logical region by allocating each of the plurality of second storage areas in one of the plurality of storage devices when a ratio of the count of random access operations to the total access count is equal to or greater than a threshold value; and
   controlling access from the information processing apparatus such that the access is made to the second logical region instead of the first logical region and is distributed among the plurality of storage devices from which the plurality of second storage areas are allocated.

2. The storage control apparatus according to claim 1, wherein:
   the determining includes selecting a value greater than the average size as the second size of the storage area to be allocated to the second logical region.

3. The storage control apparatus according to claim 2, wherein:
   a plurality of possible sizes, including a maximum possible size, of a storage area are determined in advance, the acquiring includes acquiring the average size with respect to the plurality of data records whose sizes are less than one nth of the maximum possible size, where n is a real number greater than one, and the determining includes selecting a smallest one of the possible sizes that is greater than n times the average size, as the second size of the storage area to be allocated to the second logical region.

4. The storage control apparatus according to claim 1, wherein the determining includes determining how many storage areas to allocate to the second logical region such that the second logical region is equal in size to the first logical region.

5. The storage control apparatus according to claim 1, wherein the controlling includes acquiring a logical address indicating a relative position of data stored in the first logical region with respect to a start position of the first logical region, and storing the data in the second logical region based on the logical address.

6. The storage control apparatus according to claim 1, wherein:

the procedure further includes creating information indicating a relationship between an identifier of a logical region specified by access from the information processing apparatus and the second logical region, instead of a relationship between the identifier of the logical region and the first logical region, and determining an access destination based on the newly created information to control access from the information processing apparatus.

7. A storage system comprising:

a plurality of storage devices; and a storage control apparatus that counts a count of random access operations to a first logical region in which a first storage area of a first size is allocated from each of the plurality of storage devices and a total access count which is a sum of a count of sequential access operations to the first logical region and the count of random access operations, acquires an average size of a plurality of data records accessed in the first logical region per random access operation, determines a second size of each of a plurality of second storage areas to be allocated to a second logical region based on the average size, the second size being larger than the first size and being assignable within a single storage device, and creates the second logical region by allocating each of the plurality of second storage areas in one of the plurality of storage devices when a ratio of the count of random access operations to the total access count of the first logical region is equal to or greater than a threshold value, and controls access from the information processing apparatus such that the access is made to the second logical region instead of the first logical region and is distributed among the plurality of storage devices from which the plurality of second storage areas are allocated.

8. The storage system according to claim 7, wherein: the storage control apparatus selects a value greater than the average size as the second size of the storage area to be allocated to the second logical region.

9. The storage system according to claim 8, wherein:

a plurality of possible sizes, including a maximum possible size, of a storage area are determined in advance, the storage control apparatus acquires the average size with respect to the plurality of data records whose sizes are less than one nth of the maximum possible size, where n is a real number greater than one, and the storage control apparatus selects a smallest one of the possible sizes that is greater than n times the average size, as the second size of the storage area to be allocated to the second logical region.

10. The storage system according to claim 7, wherein the storage control apparatus determines how many storage areas to allocate to the second logical region such that the second logical region is equal in size to the first logical region.

11. The storage system according to claim 7, wherein the storage control apparatus acquires a logical address indicating a relative position of data stored in the first logical region with respect to a start position of the first logical region, and stores the data in the second logical region based on the logical address.

12. The storage system according to claim 7, wherein:

the storage control apparatus creates information indicating a relationship between an identifier of a logical region specified by access from the information processing apparatus and the second logical region, instead of a relationship between the identifier of the logical region and the first logical region, and determines an access destination based on the newly created information to control access from the information processing apparatus.

13. A storage control method executed by an apparatus that controls access from an information processing apparatus to a logical region in which a first storage area of a first size is allocated from each of a plurality of storage devices, the storage control method comprising:

counting a count of random access operations to a first logical region and a total access count which is a sum of a count of sequential access operations to the first logical region and the count of random access operations;

acquiring an average size of a plurality of data records accessed in the first logical region per random access operation;

determining a second size of each of a plurality of second storage areas to be allocated to a second logical region based on the average size, the second size being larger than the first size and being assignable within a single storage device, and creating the second logical region by allocating each of the plurality of second storage areas in one of the plurality of storage devices when a ratio of the count of random access operations to the total access count is equal to or greater than a threshold value; and controlling access from the information processing apparatus such that the access is made to the second logical region instead of the first logical region and is distributed among the plurality of storage devices in which the plurality of second storage areas are allocated.

14. The storage control method according to claim 13, wherein:

the determining includes selecting a value greater than the average size as the second size of the storage area to be allocated to the second logical region.

15. The storage control method according to claim 14, wherein:

a plurality of possible sizes, including a maximum possible size, of a storage area are determined in advance, the acquiring includes acquiring the average size with respect to the plurality of data records whose sizes are less than one nth of the maximum possible size, where n is a real number greater than one, and the determining includes selecting a smallest one of the possible sizes that is greater than n times the average size, as the second size of the storage area to be allocated to the second logical region.

16. The storage control method according to claim 13, wherein the determining includes determining how many storage areas to allocate to the second logical region such that the second logical region is equal in size to the first logical region.

17. The storage control method according to claim 13, wherein the determining includes acquiring a logical address indicating a relative position of data stored in the first logical region with respect to a start position of the first logical region, and storing the data in the second logical region based on the logical address.

18. The storage control method according to claim 13, wherein the controlling includes creating information indicating a relationship between an identifier of a logical region specified by access from the information processing apparatus and the second logical region, instead of a relationship between the identifier of the logical region and the first logical region, and determining an access destination based on the newly created information to control access from the information processing apparatus.

\* \* \* \* \*